United States Patent
Chou

(10) Patent No.: US 11,622,068 B2
(45) Date of Patent: Apr. 4, 2023

(54) ELEVATABLE WEBCAM MODULE

(71) Applicant: SYNCMOLD ENTERPRISE CORP., New Taipei (TW)

(72) Inventor: Chih-Hsin Chou, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/528,330

(22) Filed: Nov. 17, 2021

(65) Prior Publication Data

US 2022/0210303 A1 Jun. 30, 2022

Related U.S. Application Data

(60) Provisional application No. 63/131,426, filed on Dec. 29, 2020.

(30) Foreign Application Priority Data

Aug. 30, 2021 (TW) ................................. 110210179

(51) Int. Cl.
  *H04N 5/225* (2006.01)
(52) U.S. Cl.
  CPC ......... *H04N 5/2257* (2013.01); *H04N 5/2251* (2013.01)
(58) Field of Classification Search
  CPC .. H04N 5/2251; H04N 5/2252; H04N 5/2257; H04M 1/0264
  USPC ........................................ 348/373, 375, 376
  See application file for complete search history.

(56) References Cited

FOREIGN PATENT DOCUMENTS

| CN | 108124085 A | * | 6/2018 | ............ H04N 5/225 |
|---|---|---|---|---|
| CN | 109379530 A | * | 2/2019 | .......... H04M 1/0264 |
| CN | 109862140 A | * | 6/2019 | |
| CN | 110460688 A | * | 11/2019 | |
| CN | 110471496 A | * | 11/2019 | ........... H04B 17/345 |
| EP | 2683159 A2 | * | 1/2014 | ............. G06F 3/167 |

* cited by examiner

*Primary Examiner* — Anthony J Daniels
(74) *Attorney, Agent, or Firm* — Muncy Geissler Olds & Lowe P.C.

(57) ABSTRACT

An elevatable webcam module is provided. The elevatable webcam module includes a fixing base, a bearing base, a webcam unit, an elastic element, a damper and a locking unit. The fixing base is fixed in a display body. The bearing base is slidably disposed on the fixing base, the bearing base is accommodated in the display body when the bearing base is at a retracted position, and the bearing base is partially exposed from the display body when the bearing base is at a protruded position. The webcam unit is disposed on the bearing base. The elastic element abuts against the fixing base and the bearing base therebetween. The damper is disposed on the fixing base and is connected to the bearing base. The locking unit is disposed on the fixing base to fix the bearing base at the retracted position. When the locking unit is unlocked, the elastic force provided by the elastic element to the bearing base overcomes the resistance provided by the damper to the bearing base, the bearing base slides from the retracted position to the protruded position.

10 Claims, 9 Drawing Sheets

ELEVATABLE WEBCAM MODULE

CROSS REFERENCE TO RELATED APPLICATION

This application claims the benefit of U.S. Provisional Application Ser. No. U.S. 63/131,426 filed on Dec. 29, 2020, and the benefit of Taiwan Patent Application Serial No. 110210179 filed on Aug. 30, 2021. The entirety of each application is incorporated herein by reference.

BACKGROUND OF THE INVENTION

1. Field of the Invention

The present invention relates to a webcam module, especially a built-in elevatable webcam module in a display.

2. Description of Related Art

Conventional built-in webcam modules, the embedded-type and the protruded-type, are usually configurated to the upper edge of the display. For the embedded-type webcam module, the display needs to reserve space for accommodating the webcam module. Therefore, the bezel is usually wider and does not conform to the product trend. For the protruded-type webcam module, the appearance is less aesthetic. In addition, there will be information security risks because the embedded-type or protruded-type webcam modules are permanently exposed at the upper edge of the frame and cannot be completely retracted when not in use.

SUMMARY OF THE INVENTION

An objective of the present invention is to provide an elevatable webcam module which is built in the display. When a user is going to use the webcam unit, the user presses the elevatable webcam module to unlock the locking unit. When an elastic force provided by the elastic element to the bearing base with the webcam unit overcomes a resistance provided by the damper to the bearing base, the bearing base gently pops up, and the webcam unit will be exposed from the display body. When the user does not use the webcam unit, the user presses the part of the webcam module that is exposed from the display body again to make the bearing base and the webcam unit be completely retracted in the display body, thus the webcam unit can be closed or completely covered and the information security risk of the built-in webcam module in the display may also be reduced.

In addition, by disposing a damper in the elevatable webcam module of the present invention, the pop-up speed of the bearing base sliding from the retracted position inside the display body to the protruded position outside the display body will be slow down. Since the bearing base does not pop up too fast, the lifting and lowering process of the bearing base is relatively stable, and the noise is also reduced. Therefore, the elevatable webcam module is less likely to be damaged, thereby providing a better user experience.

To achieve the aforesaid objective, the present invention discloses an elevatable webcam module which is disposed in a display body. The elevatable webcam module includes a fixing base, a bearing base, a webcam unit, an elastic element, a damper, and a locking unit. The fixing base is fixed in the display body. The bearing base is slidably configured to the fixing base and is able to switch between a protruded position and a retracted position relative to the display body. The bearing base is accommodated in the display body when the bearing base is at the retracted position, and the bearing base is partially exposed from the display body when the bearing base is at the protruded position. The webcam unit is disposed in the bearing base. The elastic element abuts against the fixing base and the bearing base therebetween. The damper is disposed on the fixing base and is connected to the bearing base. The locking unit is disposed on the fixing base to fix the bearing base at the retracted position. When the locking unit is unlocked, an elastic force provided by the elastic element to the bearing base overcomes a resistance provided by the damper to the bearing base to make the bearing base slide from the retracted position to the protruded position.

In one embodiment, the damper includes a gear, the bearing base includes a rack structure, the gear and the rack structure engage with each other, and when the bearing base switches between the protruded position and the retracted position, the rack structure drives the gear to rotate.

In one embodiment, the bearing base includes an extension arm, the extension arm has a sliding groove, and the fixing base further includes a body and a fixing stud, the fixing stud is disposed on the body and extends to the sliding groove, and when the bearing base is switched between the protruded position and the retracted position, the extension arm moves relative to the fixing stud.

In one embodiment, the rack structure is formed on the extension arm.

In one embodiment, the fixing base further includes an accommodating groove for accommodating the elastic element.

In one embodiment, the bearing base further includes a stopper and a shaft, the shaft is connected to the stopper and extends to the accommodating groove, and the elastic element is sleeved on the shaft and abuts against the stopper.

In one embodiment, the fixing stud includes a limiting portion and a screw, the limiting portion is disposed on the body, and the screw penetrates through the sliding groove and is secured to the limiting position, the elastic element is a compression spring.

In one embodiment, the locking unit is a pop-up mechanism.

In one embodiment, when the bearing base is at the protruded position, a top edge of the bearing base protrudes from a periphery of the display body to expose the webcam unit, and when the bearing base is at the retracted position, the top edge of the bearing base is substantially aligned with the periphery of the display body.

In one embodiment, when the bearing base is pressed by an external force and moves to a lowest position, the locking unit is able to switch between a locked state and an unlocked state.

In one embodiment, the bearing base further includes a hook which is detachably engaged with the locking unit. When the locking unit is in the locked state, the hook is fixed to the locking unit, and when the locking unit is in the unlocked state, the hook is detached from the locking unit.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
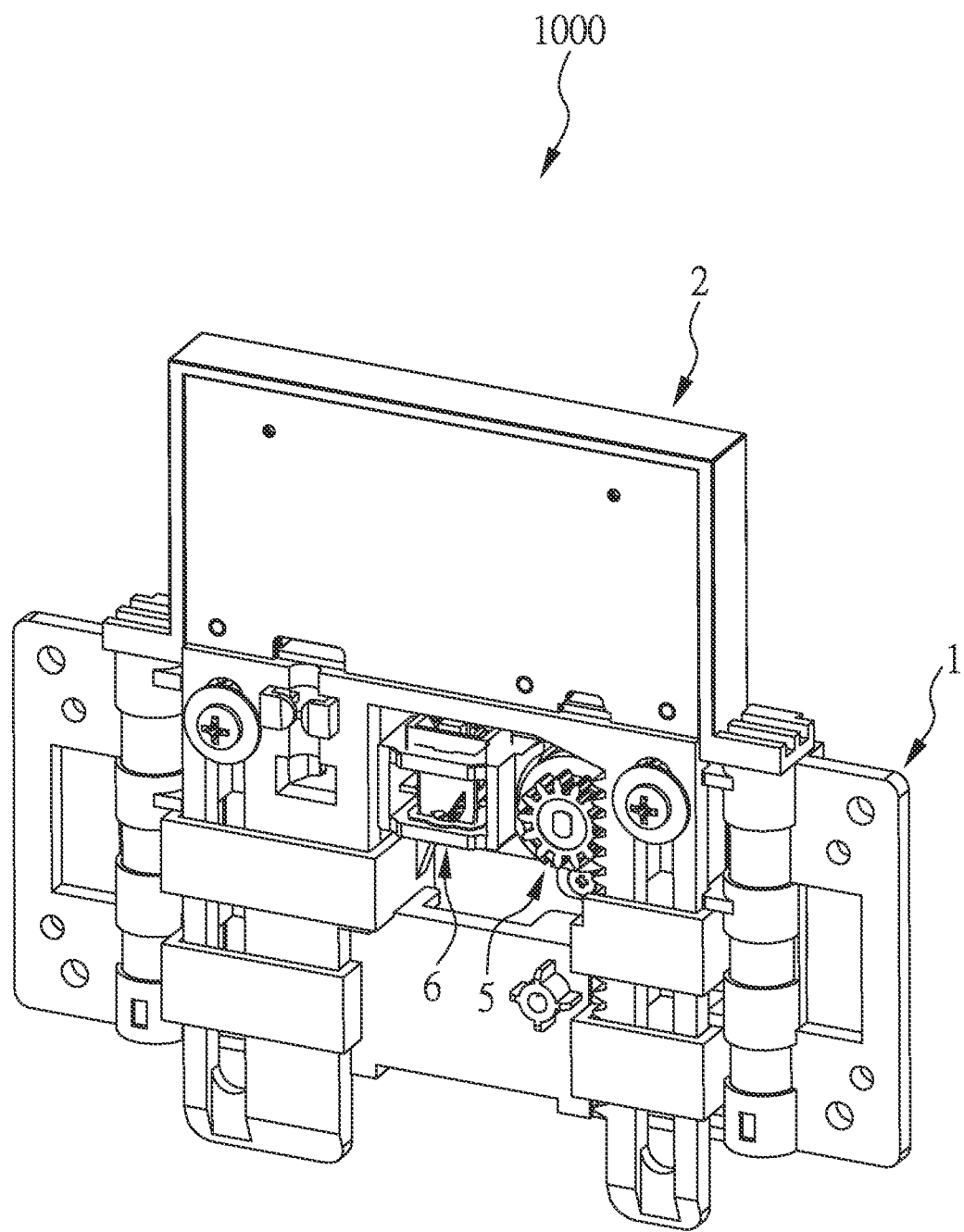
FIG. 1 is a schematic view of the elevatable webcam module according to the present invention.
Figure 2:
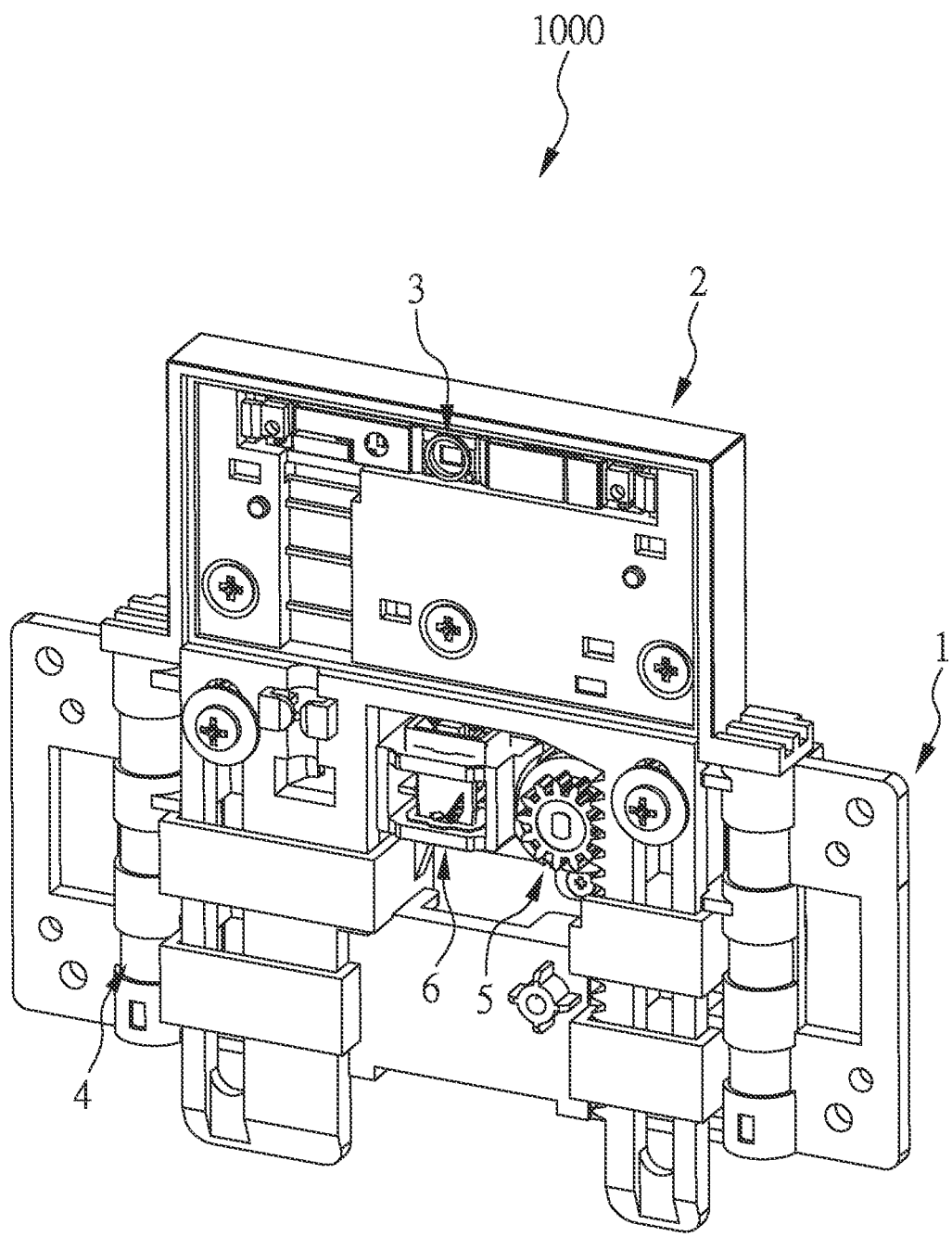
FIG. 2 is a perspective view of the elevatable webcam module according to the present invention.
Figure 3:
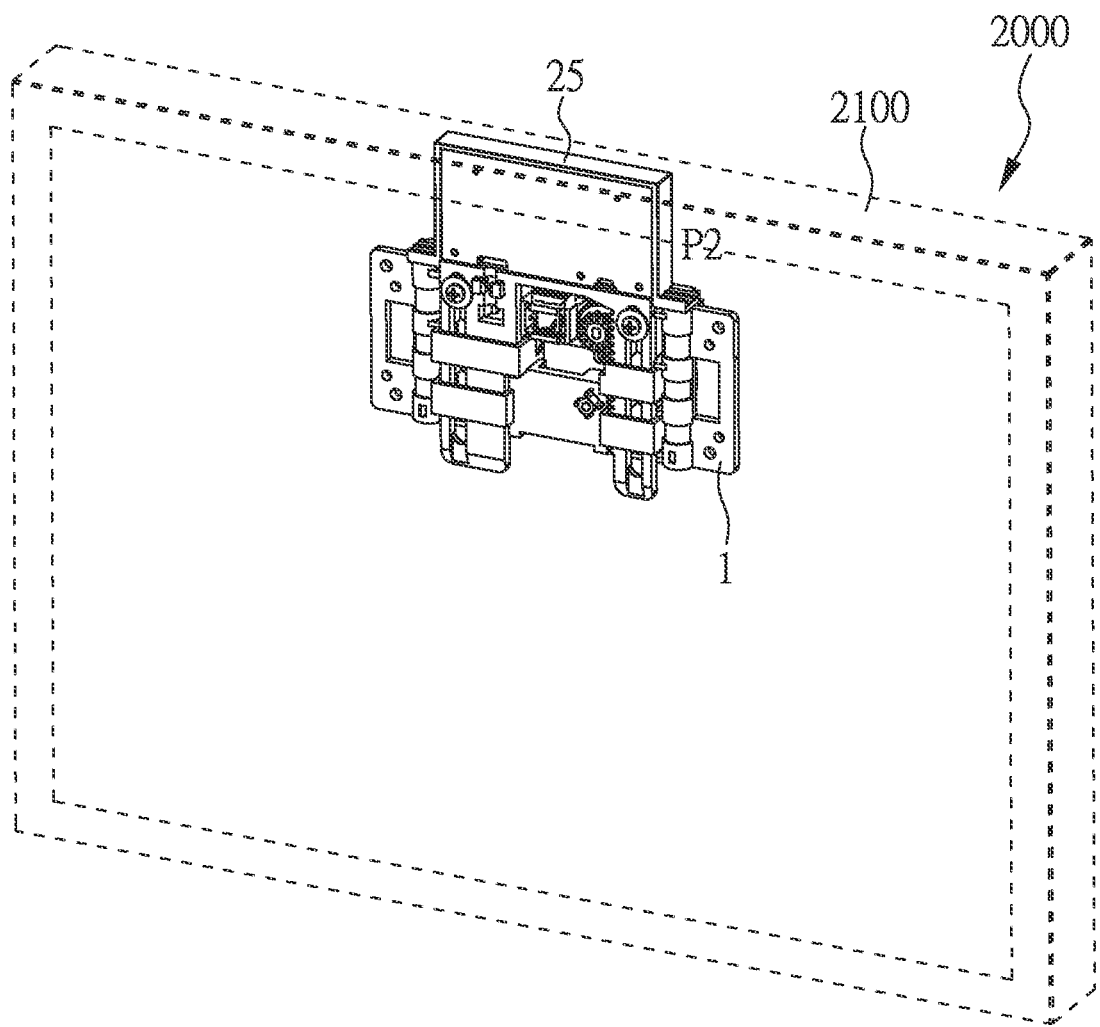
FIG. 3 depicts a schematic view of the elevatable webcam module disposed in the display body and at the retracted position according to the present invention.
Figure 4:
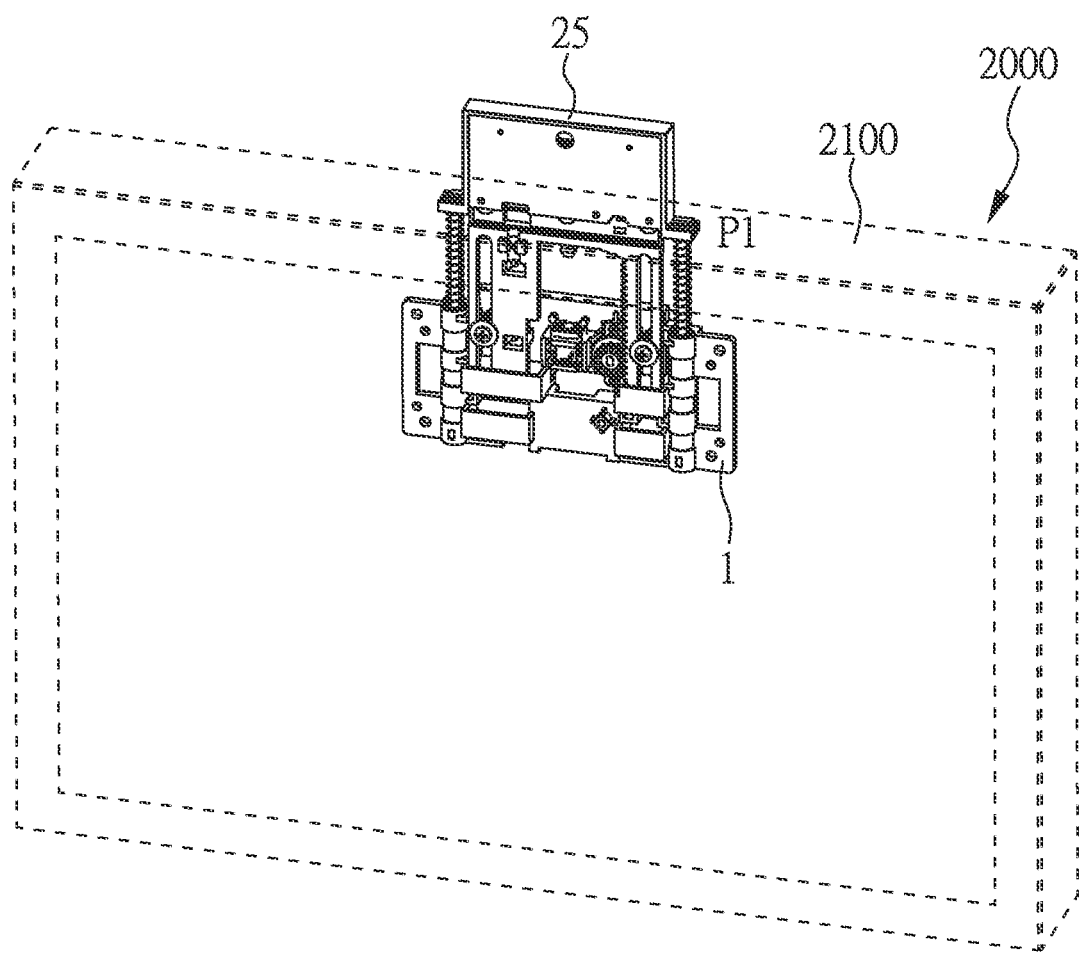
FIG. 4 depicts a schematic view of the elevatable webcam module disposed in the display body and at a protruded position according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale. Reference is made to FIG. 1 to FIG. 4. FIG. 1 is a schematic view of the elevatable webcam module 1000 of the present invention. FIG. 2 is a perspective view of the elevatable webcam module 1000 of the present invention. The elevatable webcam module 1000 includes a fixing base 1, a bearing base 2, a webcam unit 3, two elastic elements 4, a damper 5, and a locking unit 6. As shown in FIG. 3 and FIG. 4, the elevatable webcam module 1000 is disposed at a position near the upper edge of a display body 2000. The elevatable webcam module 1000 can be switched between the protruded position P1 and the retracted position P2. The elevatable webcam module 1000 is at the retracted position P2 and is completely hidden in the display body 2000 when not in use. When the user needs to use the webcam unit 3, the user may press the elevatable webcam module 1000 and then make the bearing base 2 slide to the protruded position P1.

Figure 5:
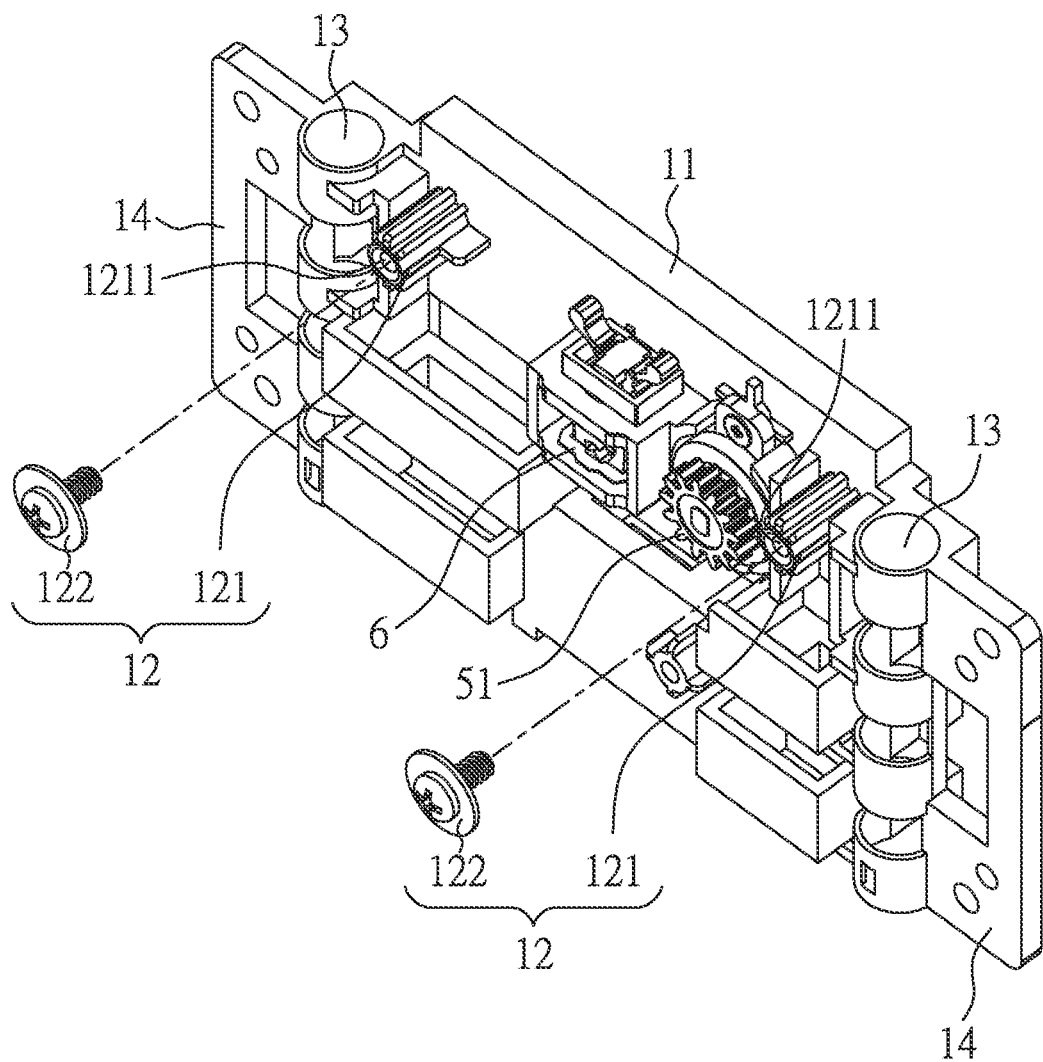
FIG. 5 is a partial schematic view of the elevatable webcam module according to the present invention.

Please refer to FIG. 5 which is a partial schematic view of the elevatable webcam module 1000 of the present invention. The fixing base 1 is fixed in the display body 2000 and includes a body 11, two fixing studs 12, two accommodating grooves 13, and two wing boards 14. The wing boards 14 are respectively connected to both sides of the body 11 and are fixed to the display body 2000 to make the elevatable webcam module 1000 be fixed to the display body 2000. Each of the fixing studs 12 is disposed on the body 11 and includes a limiting portion 121 and a screw 122. Each of the limiting portions 121 is fixed to the body 11 and has a through hole 1211, and each of the screws 122 is correspondingly detachably secured to the through holes 1211.

The accommodating grooves 13 are provided at the junction of the body 11 and the wing boards 14 for accommodating the elastic elements 4.

Figure 6:
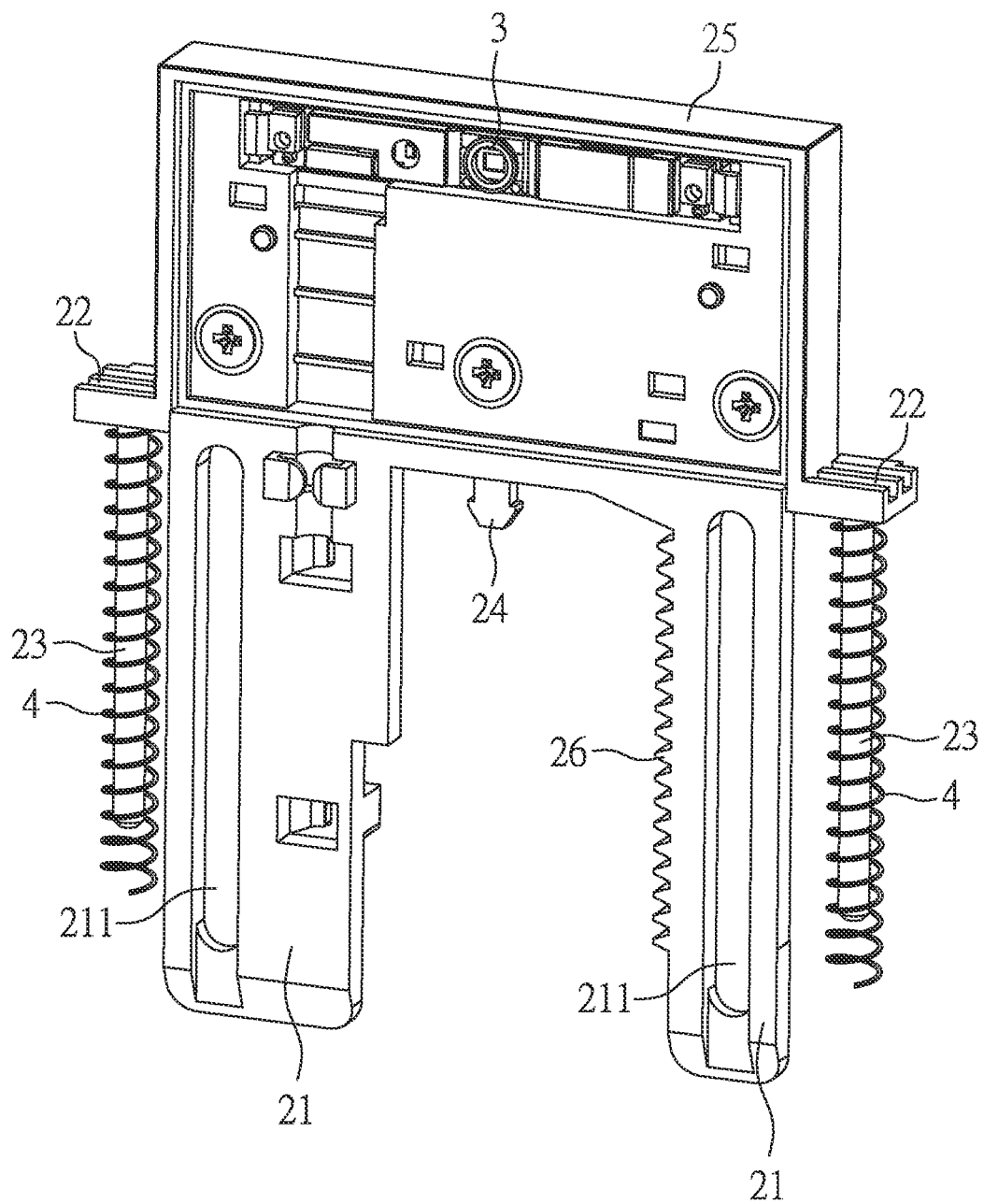
FIG. 6 is a partial schematic view of the elevatable webcam module according to the present invention.
Figure 7:
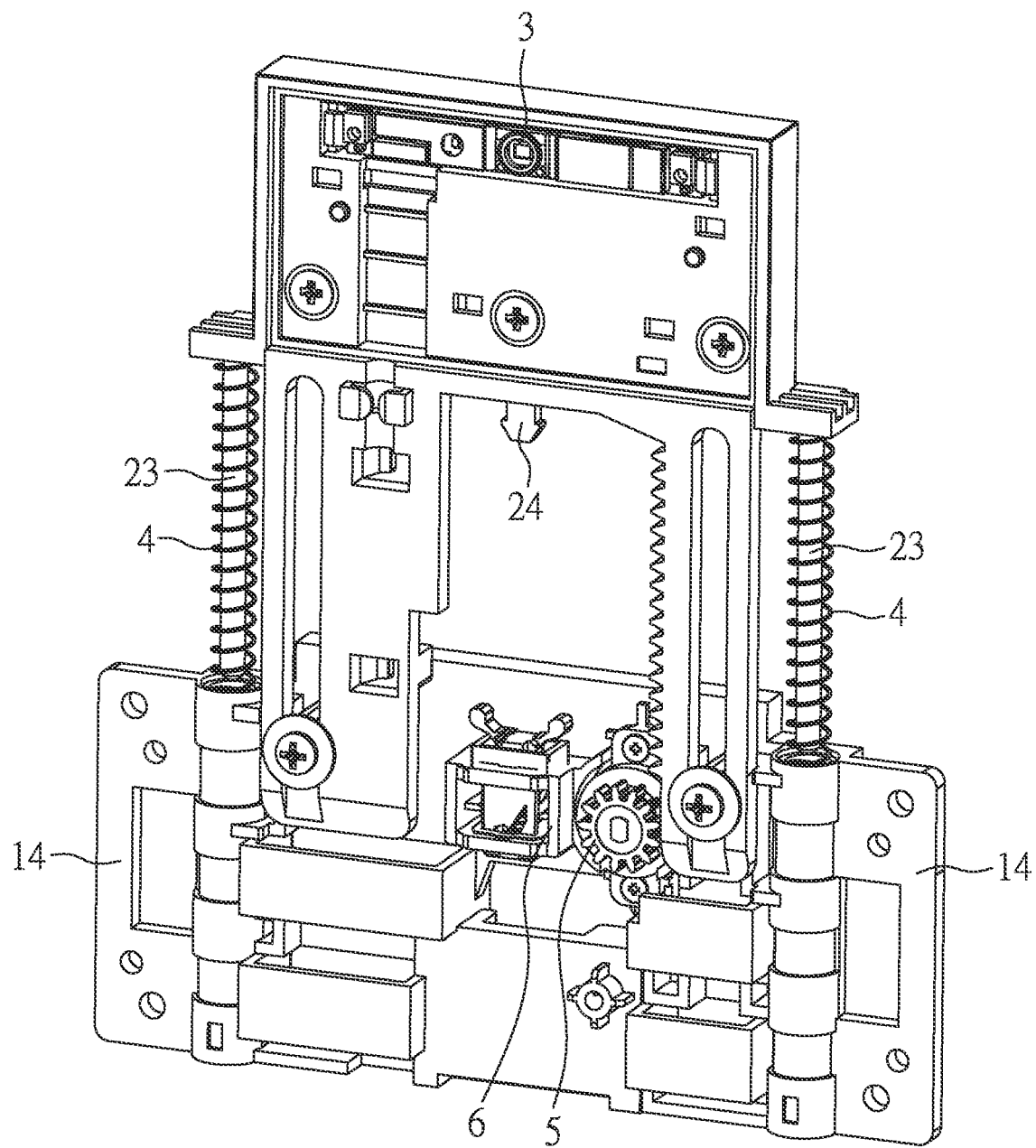
FIG. 7 depicts a perspective view of the elevatable webcam module at the protruding position according to the present invention.

Reference is made to FIG. 6 and FIG. 7. FIG. 6 is a partial schematic view of the elevatable webcam module 1000 of the present invention, and FIG. 7 depicts a perspective view of the elevatable webcam module 1000 at the protruded position. The bearing base 2 is slidably disposed on the fixed base 1 and includes two extension arms 21, two stoppers 22, two shafts 23, a hook 24, a top edge 25, and a rack structure 26.

Each extension arm 21 has a sliding groove 211. The fixing studs 12 respectively extend to the sliding grooves 211 correspondingly. When assembling the elevatable webcam module 1000, the sliding grooves 211 are respectively engaged with the limiting portions 121, and the screws 122 respectively penetrate through the sliding grooves 211 and are secured to the limiting portions 121. When the bearing base 2 switches between the protruded position P1 and the retracted position P2 relative to the display body 2000, the extension arms 21 also move relative to the fixing studs 12.

The webcam unit 3 is disposed adjacent to the top edge 25 of the bearing base 2, and the elastic elements 4 abut against the fixing base 1 and the bearing base 2 therebetween. The shafts 23 are respectively connected to the stoppers 22 and extend to the accommodating grooves 13. Each of the elastic elements 4 may be a compression spring which is sleeved on each of the shafts 23 and is pre-pressed against the stoppers 22 and the bottom of the accommodating grooves 13, whereby the elastic force can be released to make the bearing base 2 switch between the protruded position P1 and the retracted position P2.

The damper 5 is disposed on the fixing base 1 and connected to the bearing base 2. The damper 5 includes a gear 51. The rack structure 26 is formed on one of the extension arms 21. The gear 51 and the rack structure 26 engage with each other. When the bearing base 2 switches between the protruded position P1 and the retracted position P2, the rack structure 26 simultaneously drives the gear 51 to rotate. This additional load provides buffering.

Figure 8:
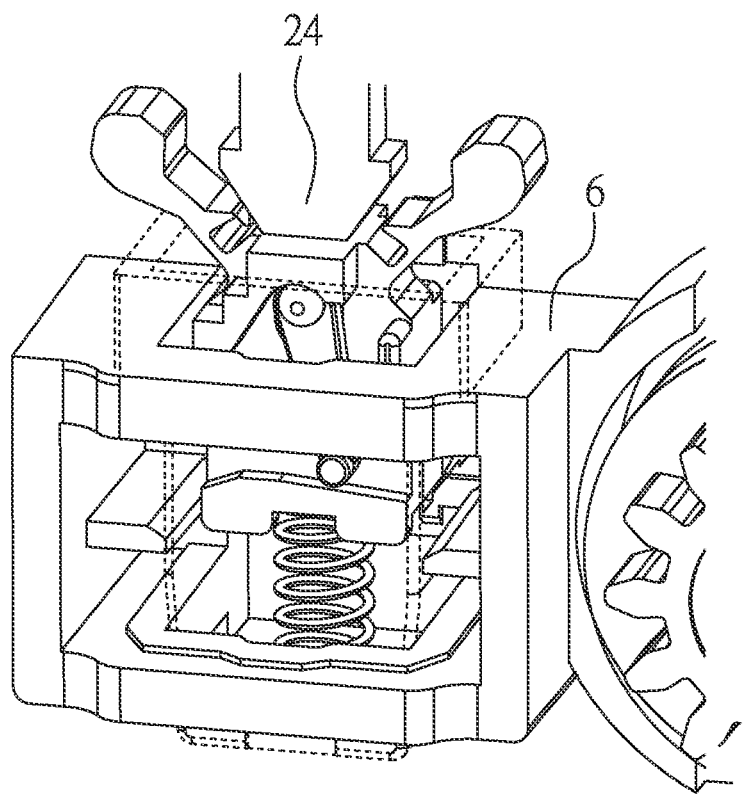
FIG. 8 depicts a schematic view of the elevatable webcam module in the unlocked state according to the present invention.
Figure 9:
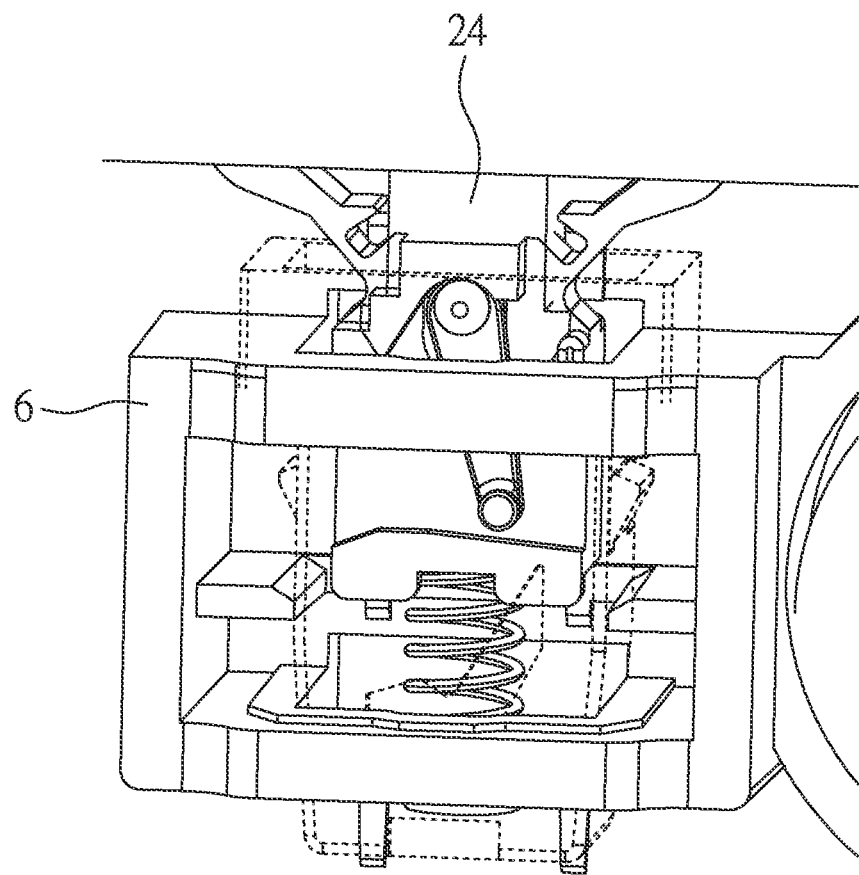
FIG. 9 depicts a schematic view of the elevatable webcam module in a locked state according to the present invention.

Reference is made to FIG. 8 and FIG. 9. FIG. 8 is a schematic view of the locking unit 6 in an unlocked state. FIG. 9 is a schematic view of the locking unit 6 in a locked state. The locking unit 6 is a pop-up mechanism or a push-push mechanism which is disposed on the fixing base 1 and can be switched between the locked state and the unlocked state. The hook 24 is disposed in the center of the bearing base 2 and is detachably engaged with the locking unit 6. When the hook 24 is engaged with the locking unit 6, the locking unit 6 secures the bearing base 2 at the retracted position P2.

In detail, if the bearing base 2 is at the protruded position P1, when the bearing base 2 is pressed by an external force and moves downward, the extension arms 21 slide downward to make the rack structure 26 drive the gear 51 to rotate, and the stoppers 22 compress the elastic elements 4 until the stoppers 22 abut against the top of the accommodating grooves 13. The limiting portions 121 are located at the top of the sliding grooves 211, and the hook 24 is engaged with the locking unit 6, thereby the bearing base 2 is secured at the retracted position P2 by the locking unit 6.

When the external force is removed, the hook 24 is secured to the locking unit 6, so the locking unit 6 is in the locked state. In this situation, the bearing base 2 is at the retracted position P2, that is, the bearing base 2 is completely accommodated in the display body 2000, and the top edge 25 of the bearing base 2 is substantially aligned with a periphery 2100 (shown in FIG. 3) of the display body 2000. In this way, the appearance of the display body 2000 maintains consistency. When the bearing base 2 is completely accommodated in the display body 2000, the webcam unit 3 is completely accommodated and covered by the display body 2000.

When the bearing base 2 is pressed by the external force again at the retracted position P2, the hook 24 can be detached from the locking unit 6 to make the locking unit 6 be in the unlocked state. When the locking unit 6 is unlocked, the stoppers 22 no longer compress the elastic elements 4, and the elastic elements 4 will release the elastic force from the pre-compressed state.

When the elastic force provided by the elastic elements 4 to the bearing base 2 overcomes the resistance provided by the damper 5 to the bearing base 2, the extension arms 21 slide upwards and drive the bearing base 2 to move upward, thereby the bearing base 2 is partially exposed from the display body 2000, and slides from the retracted position P2 to the protruded position P1. As a result, the top edge 25 of the bearing base 2 protrudes from the periphery 2100 of the display body 2000 to expose the webcam unit 3.

In addition, when the extension arms 21 slide upwards, the rack structure 26 drives the gear 51 to rotate. Therefore, the damper 5 can provide a buffering to make the lifting process more gentle and stable, and prevent the elastic elements 4 from instantly releasing the elastic force and causing the bearing base 2 to pop up too fast to generate a loud noise to frighten the user or to damage the webcam unit 3.

It should be noted that when the bearing base 2 is switching between the protruded position P1 and the retracted position P2, the limiting portions 121 move relative to the sliding grooves 211, and the gear 51 and the rack structure 26 are constantly engaged with each other. In addition, in the foregoing embodiment, the number of elements such as the limiting portions 121, the extension arms 21, the accommodating grooves 13, and the elastic elements 4 are all two, and the number of the rack structure 26 and the damper 5 is one, however, the number may be adjusted according to the actual structural requirements and are not limited herein.

According to the above, the elevatable webcam module built in the display body of the present invention can unlock or lock the locking unit by pressing the top edge of the elevatable webcam module, thus the bearing base switches between the protruded position and the retracted position to expose or hide the webcam unit and to reduce the security and damage risks of the webcam unit built in the display. In addition, by disposing a damper in the elevatable webcam module of the present invention, the pop-up speed of the bearing base sliding from the retracted position inside the display body to the protruded position outside the display body will be slowed down. Since the bearing base does not pop up too fast, the lifting and lowering process of the bearing base is stable and the noise is also reduced. Therefore, the webcam module is less likely to be damaged, thereby providing a better user experience.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An elevatable webcam module being disposed in a display body, the elevatable webcam module comprising:
    a fixing base being fixed in the display body and comprising an accommodating groove;
    a bearing base comprising a stopper and a shaft, the shaft being connected to the stopper and extending to the accommodating groove, the bearing base being slidably configured to the fixing base and being able to switch between a protruded position and a retracted position relative to the display body, wherein the bearing base is accommodated in the display body when the bearing base is at the retracted position, and wherein the bearing base is partially exposed from the display body when the bearing base is at the protruded position;
    a webcam unit being disposed in the bearing base;
    an elastic element abutting against the fixing base and the bearing base therebetween and being sleeved on the shaft and abutting against the stopper;
    a damper being disposed on the fixing base and being connected to the bearing base; and
    a locking unit being disposed on the fixing base to fix the bearing base at the retracted position;
    wherein when the locking unit is unlocked, an elastic force provided by the elastic element to the bearing base overcomes a resistance provided by the damper to the bearing base to make the bearing base slide from the retracted position to the protruded position.

2. The elevatable webcam module as claimed in claim 1, wherein the damper comprises a gear, the bearing base comprises a rack structure, the gear and the rack structure engage with each other, and when the bearing base switches between the protruded position and the retracted position, the rack structure drives the gear to rotate.

3. The elevatable webcam module as claimed in claim 2, wherein the bearing base comprises an extension arm, the extension arm has a sliding groove, and the fixing base further comprises a body and a fixing stud, and wherein the fixing stud is disposed on the body and extends to the sliding groove, and when the bearing base is switched between the protruded position and the retracted position, the extension arm moves relative to the fixing stud.

4. The elevatable webcam module as claimed in claim 3, wherein the rack structure is formed on the extension arm.

5. The elevatable webcam module as claimed in claim 4, wherein the elastic element is accommodated in the accommodating groove.

6. The elevatable webcam module as claimed in claim 1, wherein the fixing stud comprises a limiting portion and a screw, the limiting portion is disposed on the body, the screw penetrates through the sliding groove and is secured to the limiting position, and the elastic element is a compression spring.

7. The elevatable webcam module as claimed in claim 1, wherein the locking unit is a pop-up mechanism.

8. The elevatable webcam module as claimed in claim 7, wherein when the bearing base is at the protruded position, a top edge of the bearing base protrudes from a periphery of the display body to expose the webcam unit, and when the bearing base is at the retracted position, the top edge of the bearing base is substantially aligned with the periphery of the display body.

9. The elevatable webcam module as claimed in claim 8, wherein when the bearing base is pressed by an external force and moves to a lowest position, the locking unit is able to switch between a locked state and an unlocked state.

10. The elevatable webcam module as claimed in claim 9, wherein the bearing base further comprises a hook which is detachably engaged with the locking unit, and wherein the hook is fixed to the locking unit when the locking unit is in the locked state, and the hook is detached from the locking unit when the locking unit is in the unlocked state.

* * * * *